United States Patent
Liu et al.

(10) Patent No.: US 11,595,613 B2
(45) Date of Patent: Feb. 28, 2023

(54) DE-INTERLACING PROCESSING METHOD AND DEVICE, AND COMPUTER-READABLE STORAGE MEDIUM

(71) Applicant: ZTE CORPORATION, Guangdong (CN)

(72) Inventors: Chengqiang Liu, Guangdong (CN); Ke Xu, Guangdong (CN); Dehui Kong, Guangdong (CN); Limin He, Guangdong (CN); Wei Yang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 17/311,407

(22) PCT Filed: Dec. 10, 2019

(86) PCT No.: PCT/CN2019/124221
§ 371 (c)(1),
(2) Date: Jun. 7, 2021

(87) PCT Pub. No.: WO2020/119667
PCT Pub. Date: Jun. 18, 2020

(65) Prior Publication Data
US 2022/0030192 A1     Jan. 27, 2022

(30) Foreign Application Priority Data
Dec. 10, 2018  (CN) .......................... 201811504273.4

(51) Int. Cl.
*H04N 7/01*     (2006.01)
*H04N 5/14*     (2006.01)

(52) U.S. Cl.
CPC ............. *H04N 7/012* (2013.01); *H04N 5/145* (2013.01)

(58) Field of Classification Search
CPC ............................... H04N 7/012; H04N 5/145
See application file for complete search history.

(56) References Cited

U.S. PATENT DOCUMENTS 6,459,455 B1    10/2002  Jiang et al.
6,509,930 B1 *   1/2003  Hirano ................... H04N 5/145
                                                              348/700

(Continued)

FOREIGN PATENT DOCUMENTS

CN    101510985 A    8/2009
CN    102364933 A    2/2012

(Continued)

OTHER PUBLICATIONS

WIPO, International Search Report dated Feb. 25, 2020.

*Primary Examiner* — Michael Lee
(74) *Attorney, Agent, or Firm* — Li & Cai Intellectual Property (USA) Office

(57) ABSTRACT

A de-interlacing processing method, a de-interlacing processing device and a computer-readable storage medium are provided. The method includes acquiring image content characteristic information of a pixel point to be interpolated; and determining according to the image content characteristic information whether a de-interlacing algorithm based on motion adaptive or a de-interlacing algorithm based on motion compensation is adopted to perform de-interlacing processing.

13 Claims, 7 Drawing Sheets

(56) References Cited

U.S. PATENT DOCUMENTS

| | | | |
|---|---|---|---|
| 8,351,510 B1* | 1/2013 | Masterson | H04N 7/012 382/236 |
| 2005/0122426 A1* | 6/2005 | Winger | H04N 7/012 348/E5.064 |
| 2005/0134735 A1* | 6/2005 | Swartz | H04N 7/01 348/E7.003 |
| 2006/0023119 A1* | 2/2006 | Han | H04N 5/145 348/452 |
| 2007/0121001 A1* | 5/2007 | Wang | H04N 5/144 348/E5.065 |
| 2007/0252894 A1* | 11/2007 | Satou | H04N 19/577 348/448 |
| 2008/0056617 A1* | 3/2008 | Wei | H04N 7/01 382/300 |
| 2010/0110304 A1* | 5/2010 | Chen | H04N 5/21 348/E5.077 |
| 2010/0283892 A1* | 11/2010 | Zhou | H04N 5/145 348/E7.003 |
| 2016/0094803 A1* | 3/2016 | Possos | H04N 7/0115 348/448 |
| 2018/0343448 A1* | 11/2018 | Possos | H04N 19/176 |

FOREIGN PATENT DOCUMENTS

| | | |
|---|---|---|
| CN | 104349105 A | 2/2015 |
| CN | 104702877 A | 6/2015 |

\* cited by examiner

Fn as top field   Fn as bottom field

DE-INTERLACING PROCESSING METHOD AND DEVICE, AND COMPUTER-READABLE STORAGE MEDIUM

CROSS-REFERENCE TO RELATED APPLICATION

The present application claims the priority to the Chinese Patent Application No. 201811504273.4 filed with the CNIPA on Dec. 10, 2018, the entire contents of which are incorporated here by reference.

TECHNICAL FIELD

The present disclosure relates to a de-interlacing processing method, a de-interlacing processing device and a computer-readable storage medium.

BACKGROUND

Interlaced scanning is to divide each frame of image into an odd field and an even field, and a line scan frequency, a frequency spectrum of video signals, and a channel bandwidth for transmission of the video signals of the interlaced scanning are half of those in progressive scanning. Due to early undeveloped communication technology, the interlaced scanning is widely used in analog televisions in the existing art for saving the limited bandwidth. However, the interlaced scanning has some disadvantages, such as flickering, image jitter and jagged vertical edges.

Moreover, the de-interlacing processing methods in the existing art also have their own disadvantages.

SUMMARY

At least one embodiment of the present disclosure provides a de-interlacing processing method, a de-interlacing processing device and a computer-readable storage medium.

At least one embodiment of the present disclosure provides a de-interlacing processing method, including: acquiring image content characteristic information of a pixel point to be interpolated; and determining according to the image content characteristic information whether a de-interlacing algorithm based on motion adaptive (MA) or a de-interlacing algorithm based on motion compensation (MC) is adopted to perform de-interlacing processing.

At least one embodiment of the present disclosure provides a de-interlacing processing device, including a memory storing a program, and a processor. When the program is read and executed by the processor, the method according to any one embodiment is implemented.

At least one embodiment of the present disclosure provides a computer-readable storage medium storing one or more programs which are executable by one or more processors to perform the method according to any one embodiment.

DETAILED DESCRIPTION

The embodiments of the present disclosure will be described below with reference to the accompanying drawings. The embodiments and the features of the embodiments in the present disclosure can be arbitrarily combined with each other without conflict.

The steps illustrated in the flowcharts of the accompanying drawings may be performed in a computer system such as a set of computer-executable instructions. Moreover, although a logical order is illustrated in the flowchart, the steps illustrated or described may be performed in an order different from that described herein in some cases.

In an embodiment, de-interlacing (DIT) is a process of converting an interlaced video image into a progressive video image. Main de-interlacing algorithms include a de-interlacing algorithm based on MA and a de-interlacing algorithm based on MC.

The de-interlacing processing method provided by the present disclosure can combine the de-interlacing algorithm based on MA and the de-interlacing algorithm based on MC. The de-interlacing processing method according to the embodiments can realize adaptive selection of the above two algorithms according to image content characteristics.

Figure 1:
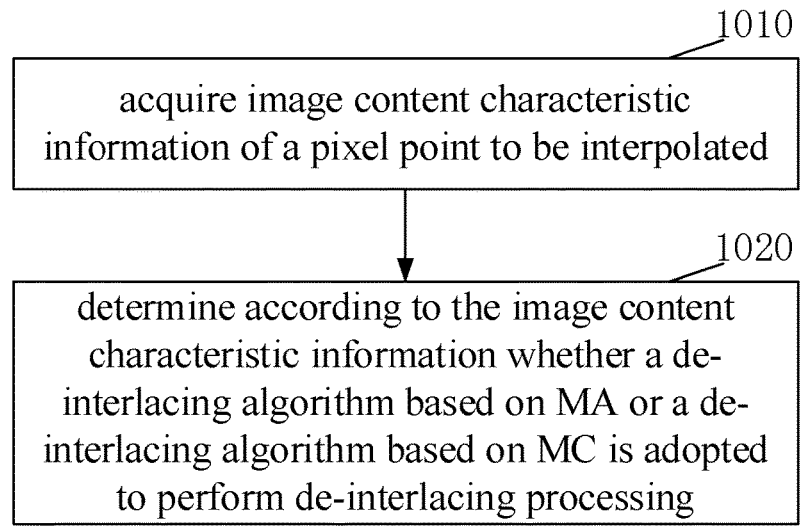
FIG. 1 is a flowchart illustrating a de-interlacing processing method according to an embodiment of the present disclosure.

As shown in FIG. 1, an embodiment of the present disclosure provides a de-interlacing processing method, including steps 1010 and 1020.

At the step 1010, image content characteristic information of a pixel point to be interpolated is acquired.

At the step 1020, whether a de-interlacing algorithm based on MA or a de-interlacing algorithm based on MC is adopted to perform de-interlacing processing is determined according to the image content characteristic information.

Compared with the existing art, the interlacing processing method according to the embodiment includes acquiring the image content characteristic information of the pixel point to be interpolated, and determining according to the image content characteristic information whether the de-interlacing algorithm based on MA or the de-interlacing algorithm based on MC is adopted to perform de-interlacing processing. The solution provided by the embodiment can achieve selecting different de-interlacing processing solutions according to the image content characteristic information. The de-interlacing algorithm based on MA has the advantages of simple implementation, and good processing effects on static images or non-horizontal edge texture of any moving object in an image. The de-interlacing algorithm based on MC has the advantages that no information is lost under a condition that a motion vector (MV) obtained by Motion Estimation (ME) is accurate, so that detail information of an object can be kept, resulting in better quality of a de-interlaced image.

In an embodiment, the image content characteristic information includes at least one of MV information, inter-field matching information, inter-frame matching information, edge direction information of the pixel point to be interpolated, and drawing-feathering intensity information.

The MV information may be obtained based on any standard algorithm, such as a matching algorithm based on sum of absolute differences (SAD) of blocks.

The edge direction information refers to the information obtained in detection of an edge direction of the pixel point to be interpolated. The detection of the edge direction is separately performed in a current field Fn and a last field Fn−1, and may be implemented with any general edge direction detection method, such as a method using the Sobel operator.

Figure 2:
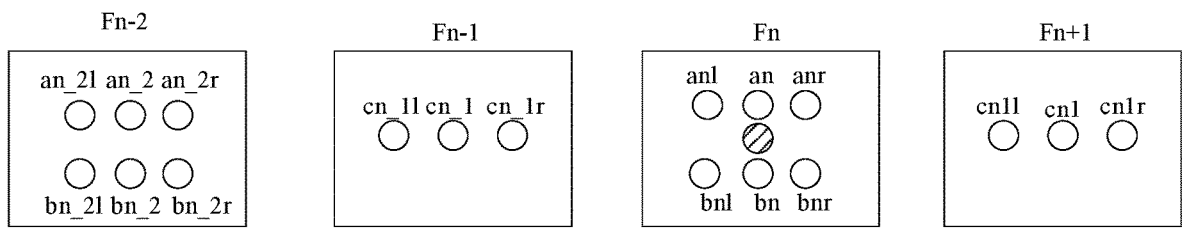
FIG. 2 is a schematic diagram of fields.

In FIG. 2, Fn−2 to Fn+1 are four fields (images of fields), Fn is a current field, Fn−1 and Fn+1 are a last (or previous) field and a next field relative to the current field, and Fn−2 is a last field relative to Fn−1. anl, an, anr, bnl, bn and bnr are pixel points in the field Fn, cn_1l, cn_1 and cn_1r are pixel points in the field Fn−1, an_2l, an_2, an_2r, bn_2l, bn_2 and bn_2r are pixel points in the field Fn−2, and cn1l, cn1 and cn1r are pixel points in the field Fn+1. The fields Fn and Fn+1 constitute a current frame curr_frame, and the fields Fn−2 and Fn−1 constitute a last frame last_frame likewise. an and bn are pixel points in the field Fn, and luminance component values of an and bn are Yan and Ybn, respectively. In the following description, Yx represents a luminance component value of a pixel point x which may be an, bn, cn1, cn_1, etc., and Y[i][j] represents luminance of a pixel point in Row i and Column j. The de-interlacing algorithm is a process of reconstructing a new progressive image by interpolating a new row of pixels between an upper row and a lower row of the current field and. In FIG. 2, the pixel point filled with oblique lines in the field Fn is a current pixel to be reconstructed, and is also called a pixel to be interpolated (i.e., a pixel point to be interpolated). The present disclosure is described below by taking the luminance component as an example, and a de-interlacing processing method in case of a chrominance component is completely the same as the method described herein.

The inter-field matching information is determined with the following method: selecting a first pixel block composed of M pixels in a last (or previous) row relative to a current row where the pixel point to be interpolated is located and a second pixel block composed of M pixels in a next row relative to the current row from a current field, determining matched blocks of the first pixel block and the second pixel block in a last field relative to the current field, obtaining a first sum of absolute differences (first SAD) according to the first pixel block and the matched block thereof, and a second SAD according to the second pixel block and the matched block thereof, and taking a maximum value of the first SAD and the second SAD as the inter-field matching information. A central position of the M pixels in the last row and a central position of the M pixels in the next row are in the same column as the pixel point to be interpolated, that is, the M pixels in the last row relative to the pixel point to be interpolated and the M pixels in the next row relative to the pixel point to be interpolated are found with the pixel point to be interpolated taken as a center, and M is a positive integer.

In other embodiments, the first SAD or the second SAD may be directly taken as the inter-field matching information.

In addition, in other embodiments, the inter-field matching information may be determined by selecting a first pixel block composed of M pixels in a last row relative to the pixel point to be interpolated and a second pixel block composed of M pixels in a next row relative to the pixel point to be interpolated from a current field, determining matched blocks of the first pixel block and the second pixel block in a next field, obtaining a third SAD and a fourth SAD, and taking a maximum value of the third SAD and the fourth SAD as the inter-field matching information. The central position of the M pixels in the last row and the central position of the M pixels in the next row are in the same column as the pixel point to be interpolated, that is, the M pixels in the last row relative to the pixel point to be interpolated and the M pixels in the next row relative to the pixel point to be interpolated are found with the pixel point to be interpolated taken as a center. In other embodiments, the third SAD or the fourth SAD may be directly taken as the inter-field matching information sad_field.

In an embodiment, the inter-frame matching information is determined with the following method: forming a current frame from a current field where the pixel point to be interpolated is located and a next field relative to the current field, selecting a pixel block in a preset size with the pixel point to be interpolated taken as a center, and matching the pixel block with a pixel block in a last frame relative to the current frame to obtain the inter-frame matching information. In an embodiment, the inter-frame matching information may be obtained by matching the pixel block with a pixel block in a next frame relative to the current frame. For example, the images of the current field Fn and the next field Fn+1 constitute a current frame image frm_curr, and the images of the fields Fn−2 and Fn−1 constitute a last frame image frm_last. Similar to the calculation of the inter-field matching information, matching is performed after an MV is calculated. A block in a preset size (such as 6=6) is selected with the current pixel point to be interpolated taken as a center, and matching is performed on the 6×6 block to calculate an inter-frame matching value sad_frame.

In an embodiment, the drawing-feathering intensity information is determined with at least one of the following methods:

an M×N pixel block with the pixel point to be interpolated as a center is taken from a synthesized frame composed of a current field and a last field; for the M×N pixel block, an accumulated value of differences between pixel values corresponding to adjacent pixel points of heterogeneous field in a column and an accumulated value of differences between pixel values corresponding to adjacent pixel points of homogeneous field in the column are calculated column by column; and the number of the columns satisfying same_parity_value[i]*coeff<dif_parity_value[i] is obtained, where same_parity_value[i] is an accumulated value of differences between pixel values corresponding to adjacent pixel points of homogeneous field in Column i in the M×N pixel block, dif_parity_value[i] is an accumulated value of differences between pixel values corresponding to adjacent pixel points of heterogeneous field in Column i in the M×N pixel block, i=0~N−1, and coeff is greater than 0; and, when the number of the columns satisfying same_parity_value[i] *coeff<dif_parity_value[i] is greater than a first threshold, the drawing-feathering intensity information is greater than a drawing intensity threshold;

for the M×N pixel block, an accumulated value of pixels in each row is acquired to obtain M accumulated values sum_value_ver[l], where l=0~M−1; (M−2) thresholds thr[j]=|(sum_value_ver[j+1]*2−sum_value_ver[j]−sum_value_ver[j+2]| are obtained according to the M accumulated values, where j=0~M−3, M is greater than or equal to 3, and N is greater than or equal to 1;

for the M×N pixel block, differences between pixel values corresponding to adjacent pixel points of homogeneous field and differences between pixel values corresponding to adjacent pixel points of heterogeneous field are calculated point by point;

frame_diff[j][i]=|Y[j][i]−Y[j+2][i]| field_diff[j][i]=|Y[j][i]−Y[j+1][i]| where i=0~N−1;

when the number of columns satisfying $$thr[j] > \text{frame\_diff}[j][i] * factor1$$

$$thr[j] < \text{field\_diff}[j][i] * factor2$$

is greater than a second threshold, the drawing-feathering intensity information is greater than the drawing intensity threshold, where factor1 and factor2 are regulatory factors for drawing detection and are greater than 0, Y[j][i] is a value of a pixel point in Row j and Column i in the M×N pixel block, such as a luminance value or a chrominance value, frame_diff[j][i] is a difference between pixel values corresponding to adjacent pixel points of homogeneous field for the pixel point in Row j and Column i in the M×N pixel block, and field_diff[j][i] is a difference between pixel values corresponding to adjacent pixel points of heterogeneous field for the pixel point in Row j and Column i in the M×N pixel block. In an embodiment, factor1 and factor2 range from 0 to 20. In an embodiment, a flag may be used to indicate whether the drawing intensity information is greater than the drawing intensity threshold; and bob_flag=1 is set to indicate that the drawing intensity information is greater than the drawing intensity threshold.

Figure 3:
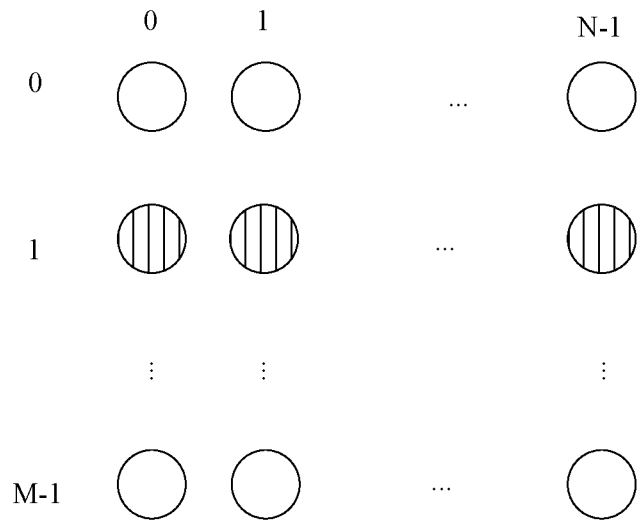
FIG. 3 is a schematic diagram of an M×N pixel block according to an embodiment of the present disclosure.

As shown in FIG. 3, in the M×N pixel block, the accumulated value of the differences between the pixel values of the adjacent pixel points of heterogeneous field in a column is calculated column by column:

the accumulated value of the differences between the pixel values of the pixel points of heterogeneous field in Column i is $$\text{dif\_parity\_value}[i] = \sum_{j=0}^{M-2} |Y[j][i] - Y[j+1][i]|,$$

where Y[j][i] is a value of the pixel point in Row j and Column i in the M×N pixel block, such as a luminance value or a chrominance value.

The accumulated value of the differences between the pixel values of the pixel points of homogeneous field in Column i in the M×N pixel block is $$\text{same\_parity\_value}[i] = \sum_{j=0}^{M-3} |Y[j][i] - Y[j+2][i]|;$$

and for the M×N pixel block, the accumulated value of the pixels in each row is acquired, for example, the accumulated value of Row 1 is $$\text{sum\_value\_ver}[l] = \sum_{i=0}^{N-1} |Y[l][i]|,$$

and the accumulated value of Row 0 is $$\text{sum\_value\_ver}[0] = \sum_{i=0}^{N-1} |Y[0][i]|.$$

The pixels of homogeneous field refer to the pixels in the same field, and the pixels of heterogeneous field refer to the pixels in different fields.

The MV information is used to evaluate motions in an image, and the inter-field matching information and the inter-frame matching information are used to evaluate the similarity between a current filed and an adjacent field or an adjacent frame. In an embodiment, the inter-frame matching information and the inter-field matching information may be other information that can be used to evaluate the similarity.

When an MV is 0 or indicates that current motion intensity meets a motion intensity threshold condition, the de-interlacing algorithm based on MA is adopted to perform de-interlacing processing. The de-interlacing processing based on MC is very sensitive to the MV obtained by the ME, and thus has a high requirement for accuracy of the MV obtained by the ME. The MV may be not reliable enough when an object rotates or is deformed, which may cause compensation errors. That is, the de-interlacing algorithm based on MA is adopted to perform de-interlacing processing in the case where the motion intensity is high (or meets the motion intensity threshold condition), thereby avoiding the compensation errors caused by the algorithm based on MC.

The inter-field matching information and the inter-frame matching information indicate the similarity between fields or frames. In the case of small similarity (a similarity threshold may be set, and the similarity is regarded as small similarity when the similarity is less than the similarity threshold), the de-interlacing algorithm based on MA is adopted to perform de-interlacing processing.

The edge direction information is used to determine whether an edge direction is a horizontal direction (the horizontal direction is a row direction in the image (i.e., a scanning direction)). If the edge direction is a non-horizontal direction, the de-interlacing algorithm based on MA is adopted to perform de-interlacing processing. As the de-interlacing processing based on MA uses intra-field directional interpolation for motions, the information of some horizontal edge textures may be lost, resulting in image flickering and blurring. In the embodiment, the de-interlacing processing based on MA is adopted in the case of non-horizontal direction, thereby avoiding the image flickering and blurring caused by the loss of the information.

The drawing-feathering intensity information is used to evaluate a difference between adjacent rows in a synthesized frame. When the motion changes significantly between two fields, the drawing-feathering intensity information is large. Therefore, when the drawing-feathering intensity information is greater than a drawing intensity threshold, the de-interlacing algorithm based on MA is adopted to perform de-interlacing processing, which can avoid the problem of compensation errors caused by the high requirement of the algorithm based on MC for the accuracy of MV in the case of large motion intensity, thereby improving an image effect.

When none of the above conditions is met, the de-interlacing algorithm based on MC is adopted to perform de-interlacing processing.

In an embodiment, the step of determining according to the image content characteristic information whether the de-interlacing algorithm based on MA or the de-interlacing algorithm based on MC is adopted to perform de-interlacing processing includes:

when one of the following conditions is satisfied, adopting the de-interlacing algorithm based on MA to perform de-interlacing processing; and when none of the following conditions is satisfied, adopting the de-interlacing algorithm based on MC to perform de-interlacing processing; and the conditions include at least one of:

a MV of the pixel point to be interpolated is 0;

an absolute value of any component of the MV of the pixel point to be interpolated is greater than a preset number of integer pixels, with the MV having two components;

the inter-field matching information is greater than a first inter-field matching threshold, and the inter-frame matching information is greater than a first inter-frame matching threshold;

the inter-field matching information is greater than a second inter-field matching threshold, and the inter-frame matching information is greater than a second inter-frame matching threshold;

the inter-field matching information is greater than the inter-frame matching information, and the inter-frame matching information is greater than a third inter-frame matching threshold;

the first edge direction information of the pixel point to be interpolated in the current field indicates a non-horizontal direction;

the second edge direction information of the pixel point to be interpolated in the last field indicates a non-horizontal direction;

the third edge direction information of the pixel point to be interpolated in the next field indicates a non-horizontal direction; and the drawing intensity information is greater than the drawing intensity threshold. That is, when the drawing-feathering intensity is too large, the de-interlacing processing based on MA is performed.

In an embodiment, the first inter-field matching threshold ranges from 0 to 300;

the second inter-field matching threshold ranges from 200 to 600;

the first inter-frame matching threshold ranges from 200 to 700;

the second inter-frame matching threshold ranges from 100 to 500; and the third inter-frame matching threshold ranges from 0 to 300.

In an embodiment, the above ranges are merely examples, and other values may be taken as required.

In an embodiment, the step of performing de-interlacing processing using the de-interlacing algorithm based on MC includes:

acquiring a first value of the pixel point to be interpolated calculated by the de-interlacing algorithm based on MA;

acquiring a second value of the pixel point to be interpolated calculated by a de-interlacing algorithm based on forward motion compensation;

acquiring a third value of the pixel point to be interpolated calculated by a de-interlacing algorithm based on backward motion compensation; and performing median filtering on the first value, the second value and the third value, and taking a result of the median filtering as a value of the pixel point to be interpolated calculated by the de-interlacing algorithm based on MC.

In other embodiments, performing de-interlacing processing by using the de-interlacing algorithm based on MC may acquire the second value or the third value, or select one of the second value and the third value.

Figure 4A:
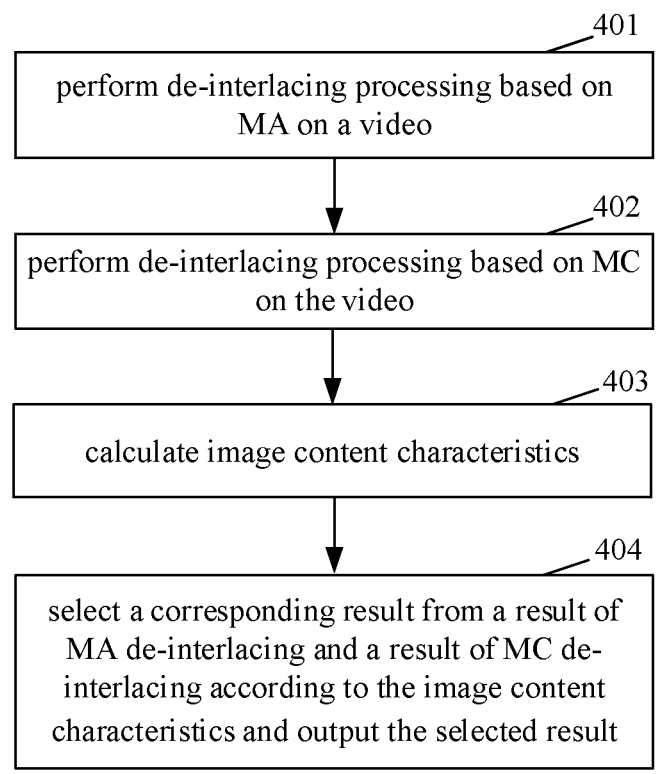
FIGS. 4a and 4b are schematic diagrams illustrating de-interlacing processing according to an embodiment of the present disclosure.
Figure 4B:
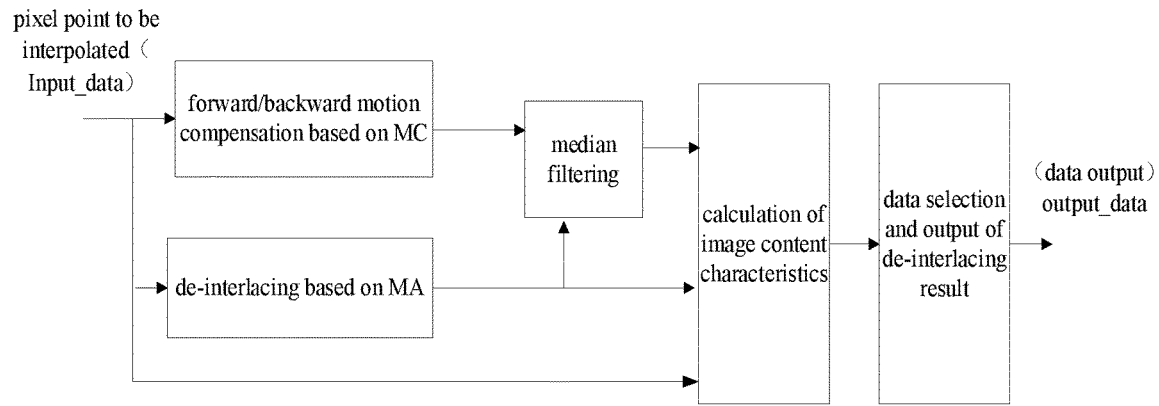

The present disclosure is illustrated by an embodiment. As shown in FIGS. 4a and 4b, a de-interlacing method according to an embodiment of the present disclosure includes steps 401 to 404.

At step 401, de-interlacing processing based on MA is performed on a video. Motion detection is performed on a current pixel, an interpolation result of an intra-field direction is selected as a result of the MA de-interlacing if the pixel is in motion, and a pixel at a corresponding position in the other field of a current frame is copied as an output of the MA de-interlacing if the pixel is static.

Figure 5:
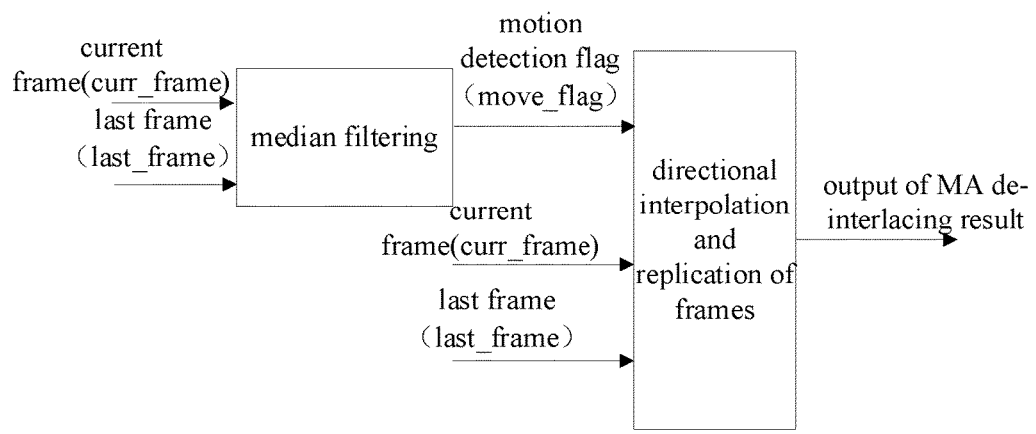
FIG. 5 is a block diagram illustrating de-interlacing based on MA.

As shown in FIG. 5, a process of the de-interlacing algorithm based on MA includes performing motion detection on a current pixel point, outputting move_flag, and, if the current pixel point is static, selecting a pixel point corresponding to one of Ycn_1, Ycn1 and (Ycn_1+Ycn1)/2, which is closest to both Yan and Ybn, as a final reconstructed pixel output for a current pixel point to be interpolated. Specifically, Ycn_1, Ycn1 and (Ycn_1+Ycn 1)/2 are compared with (Yan+Ybn)/2, and one of Ycn_1, Ycn1 and (Ycn_1+Ycn 1)/2, the difference between which and (Yan+Ybn)/2 is the smallest, is selected as the final output. Yan, Ybn and Ycn1 herein are the luminance components of the current frame, and the chrominance components are processed in the same way as the luminance components. an and bn are the upper pixel point and the lower pixel point relative to the current pixel point to be interpolated, and cn_1 and cn1 are the pixel points at the corresponding positions in the last field and the next field, respectively.

If the current pixel point is in motion, the intra-field interpolation result is used as the final reconstructed pixel output. The intra-field interpolation usually adopts an intra-field interpolation algorithm based on an edge direction.

Figure 6:
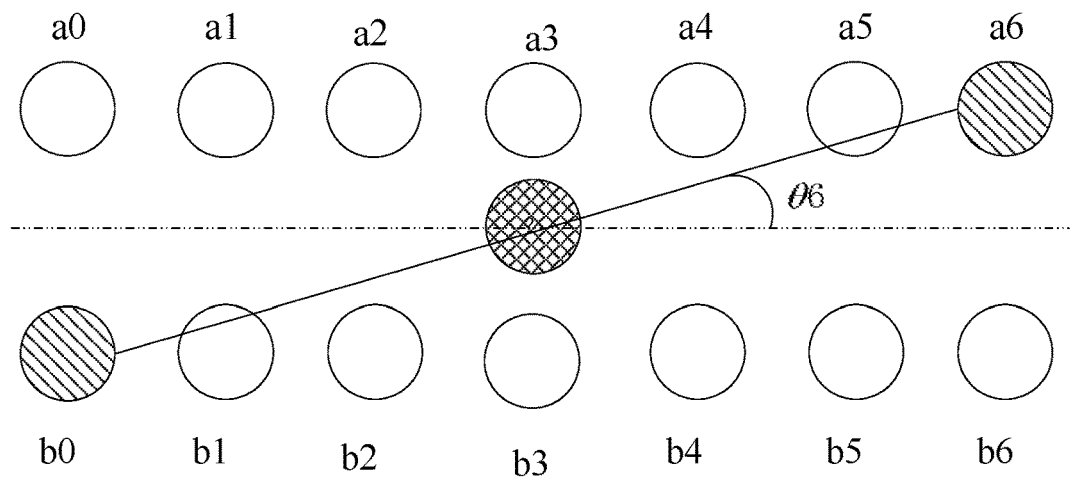
FIG. 6 is a schematic diagram illustrating a processing mode of de-interlacing processing based on MA.

As shown in FIG. 6, if an angle of an edge direction at the pixel point to be interpolated is θ6, and two pixel points, which are closest to the pixel point to be interpolated along the edge direction, are b0 and a6, the current intra-field interpolation of the pixel point to be interpolated is (Yb0+Ya6)/2. The intra-field interpolation is performed in a similar way in the case where the angle of the edge direction is another angle. The final result of MA de-interlacing is denoted by a.

In an embodiment, a de-interlacing method based on MA is not limited to the above method, and may be a modification or suitable extension of the above method.

At step 402, de-interlacing processing based on MC is performed on the video. An image is divided into N×N blocks, and each block is subjected to ME to obtain an MV of the block. Bidirectional motion compensation (i.e., forward motion compensation and backward motion compensation) is performed according to the obtained MVs. The results of the forward motion compensation, the backward motion compensation and the de-interlacing based on MA are input to a 3-input median filter to obtain a result of de-interlacing based on MC.

Figure 7:
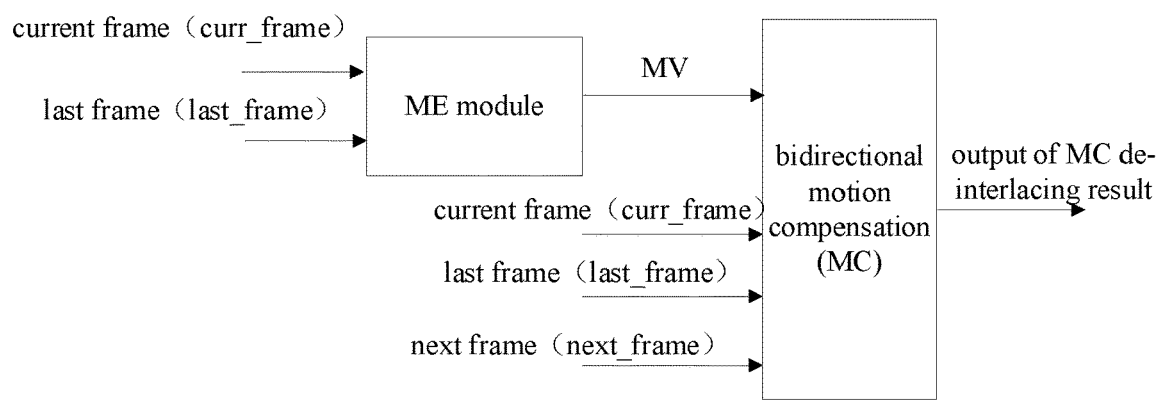
FIG. 7 is a block diagram illustrating de-interlacing based on MC.

As shown in FIG. 7, the image is divided into blocks. An MV at the pixel point to be interpolated in a block is calculated block by block. The method of calculating the MV may be any standard algorithm, such as a matching algorithm based on SADs of the blocks. The higher the accuracy of MV, the better, depending on the complexity of hardware implementation and the cost of the implementation. In the algorithm of the present disclosure, corresponding motion compensation values of the MV in an image of the last field and an image of the next field need to be obtained, that is, obtaining a forward motion compensation value and a backward motion compensation value respectively.

Figure 8:
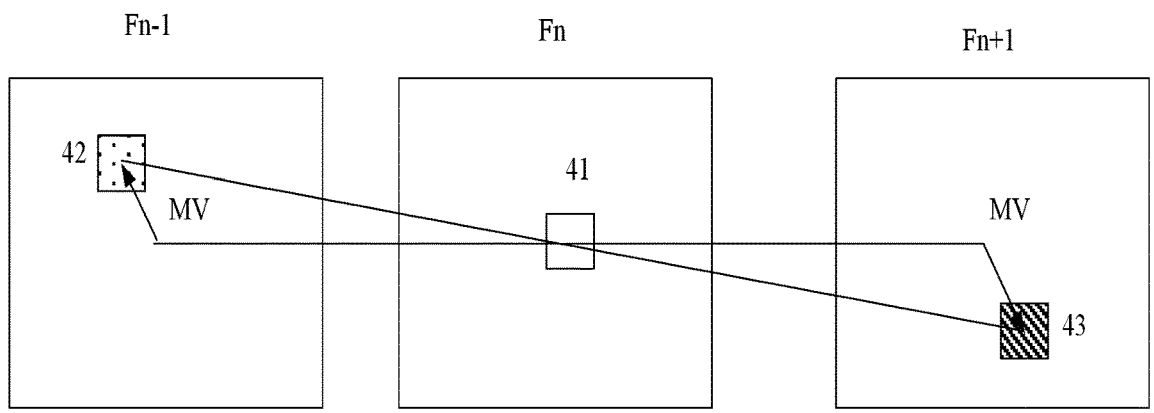
FIG. 8 is a schematic diagram illustrating de-interlacing processing based on MC.
Figure 9:
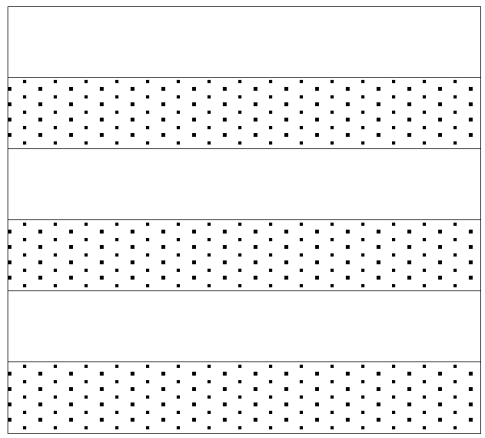
FIG. 9 is a schematic diagram illustrating a processing mode of de-interlacing processing based on MC.
Figure 9:
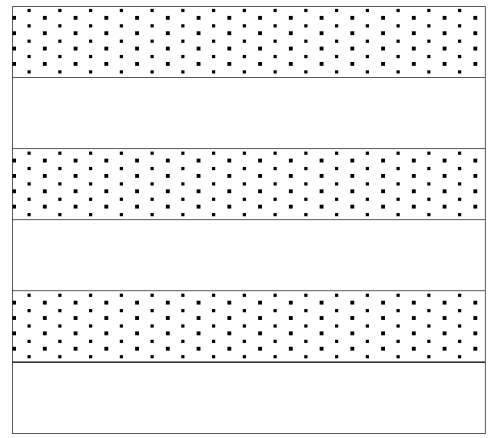

The process of motion compensation is described below by taking forward motion compensation as an example. As show in FIG. 8, a pixel block 41 in a current field Fn is a current block, a matched block of the pixel block 41 in a field Fn−1 is a block 42, and an MV at this time is as shown in FIG. 8. During motion compensation, the block 42 and the current block 41 are interlaced and combined (as shown in FIG. 9) into one frame block in the field Fn according to the value of MV, thereby completing the de-interlacing of the block 41 based on forward motion compensation. All the blocks in the field are subjected to de-interlacing in the same way as the block 41 to complete the de-interlacing of the entire field and obtain a value b. In an embodiment, there are two interlacing ways according to the characteristics of the current field, as shown in FIG. 9.

Similarly, as shown in FIG. 8, a matched block 43 in a field Fn+1 is corresponding to the current block 41, and the current block 41 and the corresponding matched block 43 in Fn+1 can be interlaced and combined into a frame block to complete the de-interlacing based on backward motion compensation, that is, obtaining a backward compensation value c.

The above steps 401 and 402 can be performed in parallel.

In an embodiment, the output of the de-interlacing based on MC is obtained by inputting the results of the forward motion compensation, the backward motion compensation, and the de-interlacing based on MA to a 3-input median filter and performing median filtering. The final result based on MC is: mc=median (a, b, c). The median filtering refers to taking a median, that is, outputting a median of the sequence of a, b and c.

In other embodiments, the median filtering may not be performed. The output of the de-interlacing algorithm based on MC may be the result obtained by the forward motion compensation, or the result obtained by the backward motion compensation, or either one of the result obtained by the forward motion compensation and the result obtained by the backward motion compensation, or one of the result obtained by the forward motion compensation and the result obtained by the backward motion compensation selected according to a certain principle.

At step 403, image content characteristics of the pixel point to be interpolated are calculated, with the image content characteristics including inter-frame matching information, inter-field matching information, edge direction information, a drawing-feathering flag and a MV value.

In an embodiment, the calculation and determination of the image content characteristics are carried out pixel by pixel rather than block by block.

The acquisition of the image content characteristics includes:

(a) The acquisition of the inter-field matching information:

M pixels in a last row relative to the pixel point to be interpolated and M pixels in a next row relative to the pixel point to be interpolated are selected from the current field Fn, and are respectively matched with an MV value (MV$_x$, Mv$_y$) of the field Fn−1 obtained by calculation to obtain two SADs, that is, sad_u and sad_d. The maximum value of the two SADs is selected as a final matching value sad_field, that is, sad_field=MAX(sad_u, sad_d).

The calculation method of the SADs is as follows:

$$SAD = \sum_{i=0}^{M-1} |YF_n(x+i, y) - YF_{n-1}(x+i+mv_x, y+mv_y)|$$

where YF$_n$(x+i,y) is the luminance of a pixel point with coordinates (x+i,y) in the field Fn, and YF$_{n-1}$(x+i+mv$_x$,y+mv$_y$) is the luminance of a pixel point with coordinated (x+i+mv$_x$,y+mv$_y$) in the field Fn−1. The value of M may be set as required.

(b) The acquisition of the inter-frame matching information:

The images of the current field Fn and the next field Fn+1 constitute a current frame image frm_curr, and the images of the fields Fn−2 and Fn−1 constitute a last frame image frm_last. Similar to the calculation of the inter-field matching information, a block with the pixel point to be interpolated as a center is selected, and matching is performed after an MV, that is, (MV$_x$, Mv$_y$), is calculated. For example, a 6×6 block which takes the position of the current pixel point to be interpolated as a center is selected, and is subjected to matching to obtain an inter-frame matching value sad_frame. The 6×6 block is merely an example, and a block in another size may be selected as required for matching. In an embodiment, the inter-frame matching information may be calculated for the current frame and the next frame.

Figure 10:
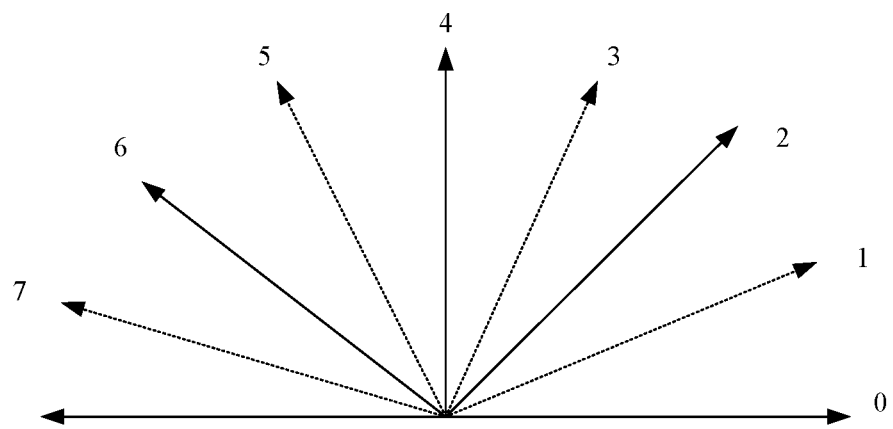
FIG. 10 is a schematic diagram of edge directions.

(c) The calculation of an edge direction of an image:

An edge direction of the current pixel point to be interpolated is detected, and the detection of the edge direction is separately performed in the current field Fn and the last field Fn−1, and may be implemented with any general edge direction detection method, such as a method using the Sobel operator. The two edge directions detected in the two fields (the current field and the last field) are denoted by angle_curr and angle1_last. The edge direction is divided into eight directions from a fixed point from 0 to 180 degrees, and the eight directions are represented by Direction 0 to Direction 7 respectively, as shown in FIG. 10. Direction 0 to Direction 7 are merely examples of representing the directions, and other values may be used to represent the directions, for example, the directions are represented directly by angles, or the directions are represented by two values indicating a horizontal direction and a non-horizontal direction. In an embodiment, the edge direction may include the edge directions of the pixel points to be interpolated in the current field and the next field, or the edge direction(s) of the pixel points to be interpolated in any one or more of the last field, the current field and the next field.

(d) The determination of a drawing-feathering flag of an image

Figure 11:
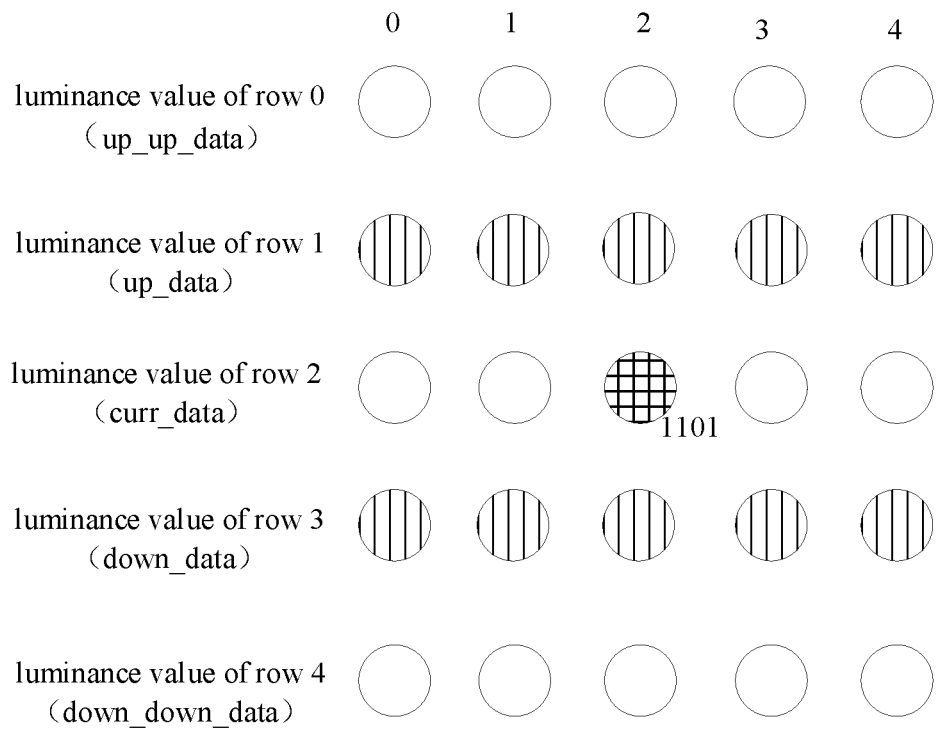
FIG. 11 is a schematic diagram of a 5×5 pixel block used in calculation of a drawing-feathering flag.

A "drawing-feathering" effect is caused by the fact that the motion of an object changes significantly between two fields in an interlaced video. Drawing-feathering is generally characterized by a large difference between adjacent rows of pixels (i.e., pixels of different fields) in a synthesized frame formed by two adjacent fields. Thus, a drawing-feathering flag of an image is calculated by the algorithm using this characteristic. The calculation method is as follows:

the drawing-feathering intensity in the current frame image is calculated in a synthesized frame formed by the current field and the last field. In an embodiment, the drawing-feathering intensity in the current frame image may be calculated in a synthesized frame formed by the current field and the next field. Taking the calculation in the synthesized frame formed by the current field and the last field as an example, the calculation method is as follows:

an M×N region with the position of the current pixel point to be interpolated as a center is selected from the current frame (the synthesized frame formed by the current field and the last field) for detection. In the following description of the calculation of the drawing-feathering flag in the algorithm, 5×5 is taken as an example of M×N, but the present disclosure is not limited thereto, and a block in another size may be selected as required for the calculation. As shown in FIG. 11, a pixel point 1101 indicates the position of the current pixel to be interpolated.

In the embodiment, two flags, bob_flag1 and bob_flag2, are calculated with the following method:

(d.1) the calculation of bob_flag1

An accumulated value of differences between pixel values of pixel points of heterogeneous field and an accumulated value of differences between pixel values of pixel points of homogeneous field in a column are calculated column by column with the following method:

dif_parity_value[i]=|up_data[i]−curr_data[i]|+|curr_data[i]−down_data[i]|+|down_data[i]−down_down_data[i]|+|up_up_data[i]−up_data[i]| same_parity_value[i]=|up_up_data[i]−curr_data[i]|+|up_data[i]−down_data[i]|++|curr_data[i]−down_down_data[i]| where i=0 . . . N−1, for example, N is 5, up_up_data[i] is a luminance value of a pixel point in Row 0 and Column i in FIG. 11, up_data[i] is a luminance value of a pixel point in Row 1 and Column i in FIG. 11, curr_data[i] is a luminance value of a pixel point in Row 2 and Column i in FIG. 11, down_data[i] is a luminance value of a pixel point in Row 3 and Column i in FIG. 11, and down_down_data[i] is a luminance value of a pixel point in Row 4 and Column i in FIG. 11. The calculation of bob_flag1 is described herein by taking N=5 as an example, and a similar calculation method is applied for other values of N.

The number wave_cnt1 of the columns which satisfy the following condition is calculated for the N columns of data in the block, same_parity_value[i]*coeff)<dif_parity_value[i]

where i=0~4, and coeff is greater than 0. In an embodiment, coeff ranges from 0 to 20.

Whether the entire 5×5 region belongs to a drawing situation of Type 1 is determined according to whether wave_cnt1 is greater than a threshold Num1, and bob_flag1 is marked by a preset value (such as 1). Num1 ranges from 1 to N. In an embodiment, for example, Num1 is 3.

(d.2) The calculation of bob_flag2

In the calculation of bob_flag2, pixel values of all pixel points in each horizontal row in the M×N block are accumulated to obtain M accumulated values in total. The calculation of bob_flag2 is described herein by taking M=5 and N=5 as an example.

$$\text{sum\_value\_ver}[0] = \sum_{i=0}^{N-1} \text{up\_up\_data}[i]$$

$$\text{sum\_value\_ver}[1] = \sum_{i=0}^{N-1} \text{up\_data}[i]$$

$$\text{sum\_value\_ver}[2] = \sum_{i=0}^{N-1} \text{curr\_data}[i]$$

$$\text{sum\_value\_ver}[3] = \sum_{i=0}^{N-1} \text{down\_data}[i]$$

$$\text{sum\_value\_ver}[4] = \sum_{i=0}^{N-1} \text{down\_down\_data}[i]$$

Three thresholds for determining drawing situations are calculated according to the above five values with the following method:

thr[j]=|(sum_value_ver[+1]*2−sum_value_ver[j]−sum_value_ver[j+2]| where j=0~M−3. When M=5, j=0~2.

Differences of pixel values of pixel points of homogeneous field and differences of pixel values of pixel points of heterogeneous field are calculated point by point for each column, but are not added up.

frame_diff[0][i]=|up_up_data[i]−curr_data[i]| frame_diff[1][i]=|up_data[i]−down_data[i]| frame_diff[2][i]=|curr_data[i]−down_down_data[i]| field_diff[0][i]=|up_data[i]−curr_data[i]| field_diff[1][i]=|curr_data[i]−down_data[i]| field_diff[2][i]=|down_data[i]−down_down_data[i]| where i=0~N−1.

Whether the current column satisfies a drawing situation of Type 2 is determined according to the thresholds and the differences of the pixel values of the pixel points in each column. For all the columns in the M×N block, the number of the columns which satisfy all of the following six conditions is calculated. The six conditions are as follows:

thr[j]>frame_diff[j][i]*factor1 thr[j]<field_diff[j][i]*factor2 where j=0~2 and i=0~N−1. When each column is subjected to comparison to determine whether the column satisfies the six conditions, the value of i is kept unchanged and the value of j is taken from 0 to 2, so the column will be subjected to comparison for six times. It is indicated that the column satisfies the drawing situation only if the column satisfies all the six conditions.

factor1 and factor2 are regulatory factors for drawing detection and are greater than 0. In an embodiment, factor1 and factor2 range from 0 to 20.

In the M×N block, the number wave_cnt2 of the columns which satisfy all the above six conditions are calculated. If wave_cnt2 is greater than Num2, bob_flag2 in the 5×5 region is marked by 1. Num2 ranges from 1 to N. In an embodiment, for example, Num2 is 3.

(d.3) In the current 5×5 region, the drawing-feathering flag bob_flag at the pixel point to be interpolated is set to 1 when bob_flag1 or bob_flag2 is marked by 1. In an embodiment, setting bob_flag to 1 is merely an example, and bob_flag can be set to other values as required to indicate that the current drawing-feathering intensity satisfies the drawing intensity condition. In other embodiments, bob_flag2 is not calculated when bob_flag1=1 is determined, and the drawing-feathering flag bob_flag at the pixel point to be interpolated is set to 1; or bob_flag1 is not calculated when bob_flag2=1 is determined, and the drawing-feathering flag bob_flag at the pixel point to be interpolated is set to 1; or bob_flag is not set, and bob_flag1 and bob_flag2 are directly output.

The above steps (a) to (d) can be performed in parallel in the process of calculating the image content characteristics.

At the step 404, a corresponding result is selected from a result of MA de-interlacing and a result of MC de-interlacing according to the image content characteristics and the selected result is output.

In other embodiments, it is possible to first determine whether the de-interlacing processing based on MA or the de-interlacing processing based or MC is to be performed. If the de-interlacing processing based on MA is to be performed, the de-interlacing processing based or MC is not required.

In an embodiment, the result of de-interlacing based on MA is selected if one of the follow conditions is satisfied, and the result of de-interlacing based on MC is selected if none of the follow conditions is satisfied.

MV Conditions:

(1) A current MV is 0, indicating that the image is static; and (2) An absolute value of any component of the current MV is greater than T integer pixels, and T is greater than 0, which indicates large motion intensity. In an embodiment, for example, T is 9. The de-interlacing algorithm based on MA is adopted in the case of large motion intensity;

SAD Conditions:

(3) sad_field>sad_field_thr1 and sad_frame>sad_fram_thr1. The smaller sad_field is, the higher the inter-field similarity is; and the smaller sad_frame is, the higher the inter-frame similarity is;

(4) sad_field>sad_field_thr2 and sad_frame>sad_frame_thr2;

(5) sad_field>sad_frame and sad_frame>sad_frame_thr3;

where sad_field_thr1 ranges from 0 to 300;

sad_field_thr2 ranges from 200 to 600;

sad_frame_thr1 ranges from 200 to 700;

sad_frame_thr2 ranges from 100 to 500;

sad_frame_thr3 ranges from 0 to 300;

Edge Angle Condition:

(6) angle_curr>0 or angle1_last>0. According to the above description, 0~7 are used to indicate directions from 0 to 180 degrees, so angle_curr>0 or angle1_last>0 indicates that a current edge direction is a non-horizontal direction. If other values are used to indicate the directions, the expression may be changed accordingly. When the edge direction is a non-horizontal direction, the de-interlacing algorithm based on MA is adopted.

Drawing Condition:

(7) bob_flag=1, indicating large differences between rows. The de-interlacing algorithm based on MA is adopted in the case of large differences between rows.

In an embodiment, the conditions may be any one or more of the above conditions (1) to (7).

In at least one embodiment of the present disclosure, according to the features of the de-interlacing algorithm based on MA and the de-interlacing algorithm based on MC and the image content of the video, a suitable result is adaptively selected from the results of the above two algorithms and is output. As the de-interlacing processing based on MA uses intra-field directional interpolation for motions, the information of some horizontal edge textures may be lost, resulting in image flickering and blurring. In the case where an intra-field direction is determined inaccurately, image noises may be caused. The de-interlacing processing based on MC is very sensitive to the MV obtained by the ME, and thus has a high requirement for accuracy of the MV obtained by the ME. The MV may be not reliable enough when an object rotates or is deformed, which may cause compensation errors. As shown by actual display of a television and experiments, the solution provided by at least one embodiment of the present disclosure overcomes the defects of the MA-based algorithm, that is, image flickering and blurring, and also overcomes the defects of the MC-based algorithm, that is, high requirement for MV accuracy, high sensitivity to MVs and strong possibility of generating the noises, thereby enhancing the overall image effect. In addition, as the present disclosure proposes the combination of two algorithms, some de-interlacing devices in the existing arts can be improved well accordingly.

Figure 12:
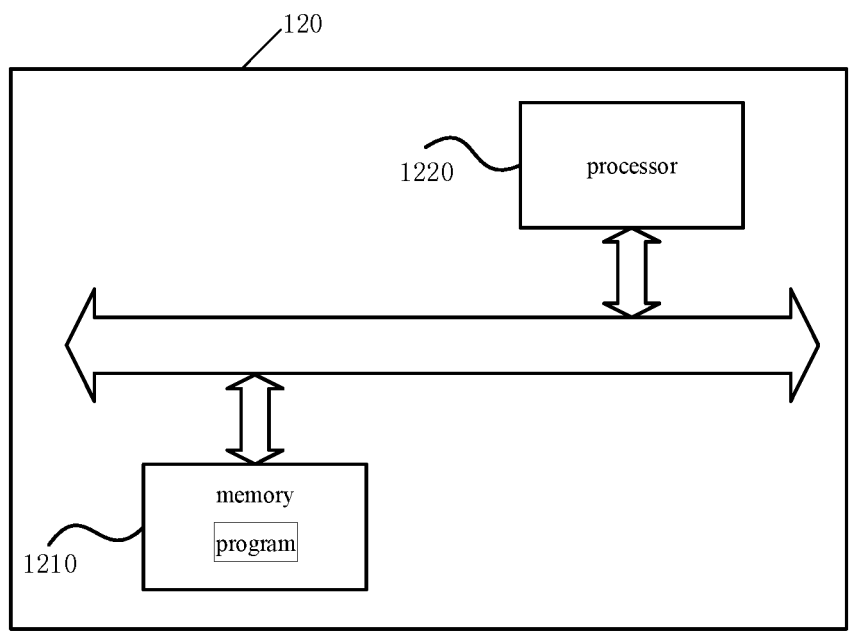
FIG. 12 is a schematic diagram of a de-interlacing processing device according to an embodiment of the present disclosure.

As shown in FIG. 12, an embodiment of the present disclosure provides a de-interlacing processing device 120, including a memory 1210 storing a program, and a processor 1220. When the program is read and executed by the processor 1220, the method according to any one embodiment is implemented.

Figure 13:
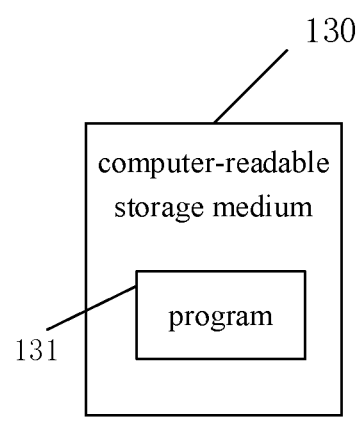
FIG. 13 is a schematic diagram of a computer-readable storage medium according to an embodiment of the present disclosure.

As shown in FIG. 13, at least one embodiment of the present disclosure provides a computer-readable storage medium 130 storing one or more programs 131 which are executable by one or more processors to perform the method according to any one embodiment.

The functional modules/units in all or some of the steps, the systems, and the devices in the method disclosed above may be implemented as software, firmware, hardware, or suitable combinations thereof. If implemented as hardware, the division between the functional modules/units stated above is not necessarily corresponding to the division of physical components; for example, one physical component may have a plurality of functions, or one function or step may be performed through cooperation of one or more physical components. Some or all of the components may be implemented as software executed by a processor, such as a digital signal processor or a microprocessor, or may be implemented as hardware, or may be implemented as an integrated circuit, such as an application specific integrated circuit. Such software may be distributed on computer-readable media, which may include computer storage media (or non-transitory media) and communication media (or transitory media). The term "computer storage media" includes volatile/nonvolatile and removable/non-removable media used in any method or technology for storing information (such as computer-readable instructions, data structures, program modules and other data). The computer storage media include a Random Access Memory (RAM), a Read-Only Memory (ROM), an Electrically Erasable Programmable Read-Only Memory (EEPROM), a Flash Memory or other memory techniques, a Compact Disc Read Only Memory (CD-ROM), a Digital Video Disk (DVD) or other optical discs, a magnetic cassette, a magnetic tape, a magnetic disk or other magnetic storage devices, or any other media which can be configured to store the desired information and can be accessed by a computer. In addition, the communication media generally include computer-readable instructions, data structures, program modules, or other data in modulated data signals such as carrier wave or other transmission mechanism, and may include any information delivery medium.

What is claimed is:

1. A de-interlacing processing method, comprising:
acquiring image content characteristic information of a pixel point to be interpolated; and
determining according to the image content characteristic information whether a de-interlacing algorithm based on motion adaptive or a de-interlacing algorithm based on motion compensation is adopted to perform de-interlacing processing,
wherein the step of performing de-interlacing processing using the de-interlacing algorithm based on motion compensation comprising:
acquiring a first value of the pixel point to be interpolated calculated by the de-interlacing algorithm based on motion adaptive;
acquiring a second value of the pixel point to be interpolated calculated by a de-interlacing algorithm based on forward motion compensation;
acquiring a third value of the pixel point to be interpolated calculated by a de-interlacing algorithm based on backward motion compensation; and
performing median filtering on the first value, the second value and the third value, and taking a result of the median filtering as a value of the pixel point to be interpolated calculated by the de-interlacing algorithm based on motion compensation.

2. The method according to claim 1, wherein the image content characteristic information comprises at least one of motion vector information, inter-field matching information, inter-frame matching information, edge direction information, or drawing-feathering intensity information.

3. The method according to claim 2, wherein the step of determining according to the image content characteristic information whether the de-interlacing algorithm based on motion adaptive or the de-interlacing algorithm based on motion compensation is adopted to perform de-interlacing processing comprises:
when one of the following conditions is satisfied, adopting the de-interlacing algorithm based on motion adaptive to perform de-interlacing processing; and
when none of the following conditions is satisfied, adopting the de-interlacing algorithm based on motion compensation to perform de-interlacing processing;
wherein, the conditions comprise at least one of:
a motion vector of the pixel point to be interpolated is 0;
an absolute value of any component of the motion vector of the pixel point to be interpolated is greater than a preset number of integer pixels;
the inter-field matching information of the pixel point to be interpolated is greater than a first inter-field matching threshold, and the inter-frame matching information of the pixel point to be interpolated is greater than a first inter-frame matching threshold;
the inter-field matching information of the pixel point to be interpolated is greater than a second inter-field matching threshold, and the inter-frame matching information of the pixel point to be interpolated is greater than a second inter-frame matching threshold;
the inter-field matching information of the pixel point to be interpolated is greater than the inter-frame matching information, and the inter-frame matching information of the pixel point to be interpolated is greater than a third inter-frame matching threshold;
first edge direction information of the pixel point to be interpolated in a current field indicates a non-horizontal direction;
second edge direction information of the pixel point to be interpolated in a last field relative to the current field indicates a non-horizontal direction;
third edge direction information of the pixel point to be interpolated in a next field relative to the current field indicates a non-horizontal direction; or
the drawing-feathering intensity information of the pixel point to be interpolated is greater than a drawing intensity threshold.

4. The method according to claim 3, wherein
the first inter-field matching threshold ranges from 0 to 300;
the second inter-field matching threshold ranges from 200 to 600;
the first inter-frame matching threshold ranges from 200 to 700;
the second inter-frame matching threshold ranges from 100 to 500; and
the third inter-frame matching threshold ranges from 0 to 300.

5. The method according to claim 2, wherein the inter-field matching information is determined with the following method: selecting a first pixel block composed of M pixels in a last row relative to a current row where the pixel point to be interpolated is located and a second pixel block composed of M pixels in a next row relative to the current row from a current field, determining matched blocks of the first pixel block and the second pixel block in a last field relative to the current field, obtaining a first sum of absolute differences according to the first pixel block and the matched block thereof, and a second sum of absolute differences according to the second pixel block and the matched block thereof, and taking a maximum value of the first sum of absolute differences and the second sum of absolute differences as the inter-field matching information, wherein a central position of the M pixels in the last row and a central position of the M pixels in the next row are in a same column as the pixel point to be interpolated, and M is a positive integer.

6. The method according to claim 2, wherein the inter-frame matching information is determined with the following method: forming a current frame from a current field where the pixel point to be interpolated is located and a next field relative to the current field, selecting a pixel block in a preset size with the pixel point to be interpolated taken as a center, and matching the pixel block with a pixel block in a last frame relative to the current frame to obtain the inter-frame matching information.

7. The method according to claim 3, wherein the drawing-feathering intensity information is determined with at least one of the following methods:
an M×N pixel block with the pixel point to be interpolated as a center is taken from a synthesized frame composed of a current field and a last field relative to the current field; for the M×N pixel block, an accumulated value of differences between pixel values corresponding to adjacent pixel points of heterogeneous field in a column and an accumulated value of differences between pixel values corresponding to adjacent pixel points of homogeneous field in the column are calculated column by column; and a total number of the columns satisfying same_parity_value[i]*coeff<dif_parity_value[i] is obtained, wherein same_parity_value[i] is an accumulated value of differences between pixel values corresponding to adjacent pixel points of homogeneous field in Column i in the M×N pixel block, dif_parity_value[i] is an accumulated value of differences between pixel values corresponding to adjacent pixel points of heterogeneous field in Column i in the M×N pixel block, i=0~N−1, and coeff is greater than 0; and, when the total number of the columns satisfying same_parity_value[i]*coeff<dif_parity_value[i] is greater than a first threshold, the drawing-feathering intensity information is greater than the drawing intensity threshold;

for the M×N pixel block, an accumulated value of pixels in each row is acquired to obtain M accumulated values sum_value_ver[l], where l=0~M−1; (M−2) thresholds thr[j]=|(sum_value_ver[j+1]*2−sum_value_ver[j]−sum_value_ver[j+2]| are obtained according to the M accumulated values, where j=0~M−3, M is greater than or equal to 3, and N is greater than or equal to 1;

differences between pixel values corresponding to adjacent pixel points of homogeneous field and differences between pixel values corresponding to adjacent pixel points of heterogeneous field are calculated point by point:

$$\text{frame\_diff}[j][i]=|Y[j][i]-Y[j+2][i]|$$

$$\text{field\_diff}[j][i]=|Y[j][i]-Y[j+1][i]|$$

where i=0~N−1; when a total number of columns satisfying $$thr[j] > \text{frame\_diff}[j][i] * factor1$$

$$thr[j] < \text{field\_diff}[j][i] * factor2$$

is greater than a second threshold, the drawing-feathering intensity information is greater than the drawing intensity threshold, where factor1 and factor2 are regulatory factors for drawing detection and are greater than 0, Y[j][i] is a value of a pixel point in Row j and Column i in the M×N pixel block, frame_diff[j][i] is a difference between pixel values corresponding to adjacent pixel points of homogeneous field for the pixel point in Row j and Column i in the M×N pixel block, and field_diff[j][i] is a difference between pixel values corresponding to adjacent pixel points of heterogeneous field for the pixel point in Row j and Column i in the M×N pixel block.

8. A de-interlacing processing device, comprising a memory storing a program, and a processor, wherein the method according to claim 1 is implemented when the program is read and executed by the processor.

9. A non-transitory computer-readable storage medium storing one or more programs, wherein the one or more programs are executable by one or more processors to perform the method according to claim 1.

10. A de-interlacing processing device, comprising a memory storing a program, and a processor, wherein the method according to claim 2 is implemented when the program is read and executed by the processor.

11. A de-interlacing processing device, comprising a memory storing a program, and a processor, wherein the method according to claim 3 is implemented when the program is read and executed by the processor.

12. A de-interlacing processing device, comprising a memory storing a program, and a processor, wherein the method according to claim 4 is implemented when the program is read and executed by the processor.

13. A de-interlacing processing device, comprising a memory storing a program, and a processor, wherein the method according to claim 5 is implemented when the program is read and executed by the processor.

* * * * *

UNITED STATES PATENT AND TRADEMARK OFFICE
CERTIFICATE OF CORRECTION

PATENT NO. : 11,595,613 B2
APPLICATION NO. : 17/311407
DATED : February 28, 2023
INVENTOR(S) : Chengqiang Liu et al.

It is certified that error appears in the above-identified patent and that said Letters Patent is hereby corrected as shown below:

In the Specification

Column 12, Lines 22, the parameter reading -ver[+1]- should read --$ver[j+1]$--

Signed and Sealed this
Twenty-seventh Day of June, 2023

Katherine Kelly Vidal
*Director of the United States Patent and Trademark Office*